United States Patent [19]

Melen

[11] Patent Number: 6,141,440
[45] Date of Patent: Oct. 31, 2000

[54] DISPARITY MEASUREMENT WITH VARIABLY SIZED INTERROGATION REGIONS

[75] Inventor: Roger D. Melen, Los Altos Hills, Calif.

[73] Assignee: Canon Kabushiki Kaisha, Japan

[21] Appl. No.: 09/090,773

[22] Filed: Jun. 4, 1998

[51] Int. Cl.[7] .................................................. G06K 9/00
[52] U.S. Cl. .............................................. 382/154; 382/209
[58] Field of Search .................................. 382/154, 209, 382/294; 348/47, 48

[56] References Cited

U.S. PATENT DOCUMENTS

| | | | |
|---|---|---|---|
| 3,769,889 | 11/1973 | Wechsler | 95/18 P |
| 3,883,251 | 5/1975 | Helava | 356/203 |
| 5,249,035 | 9/1993 | Yamanaka | 356/376 |
| 5,347,363 | 9/1994 | Yamanaka | 356/376 |
| 5,390,024 | 2/1995 | Wright | 356/376 |
| 5,432,712 | 7/1995 | Chan | 364/514 R |
| 5,455,689 | 10/1995 | Taylor et al. | 358/450 |
| 5,475,422 | 12/1995 | Mori et al. | 348/48 |
| 5,495,576 | 2/1996 | Ritchey | 395/125 |
| 5,510,931 | 4/1996 | Mayhew | 348/47 |
| 5,644,651 | 7/1997 | Cox et al. | 382/154 |
| 5,655,033 | 8/1997 | Inoguchi et al. | 382/293 |
| 5,680,474 | 10/1997 | Iijima et al. | 382/154 |
| 5,719,954 | 2/1998 | Onda | 382/154 |
| 5,727,078 | 3/1998 | Chupeau | 382/154 |
| 5,764,809 | 6/1998 | Nomami et al. | 382/284 |
| 5,768,404 | 6/1998 | Morimura et al. | 382/107 |
| 5,815,411 | 9/1998 | Ellenby et al. | 364/559 |
| 5,886,822 | 3/1999 | Spitzer | 359/630 |

FOREIGN PATENT DOCUMENTS

| | | | |
|---|---|---|---|
| 8-160879 | 6/1996 | Japan | G09F 9/00 |

OTHER PUBLICATIONS

Zhizhuo, W., "From Photogrammetry to Geomatics—a Commemoration of the Accomplishment that is VirtuoZo", The VirtuoZo Manuscript, Dec. 18, 1997, Australia.

Roux, M., "Cartography Updating", Mar. 24, 1998, France.

Dupëret. A., "Automatic Derivation of a DTM to Produce Countour Lines", Mar. 24, 1998, France.

*Primary Examiner*—Bhavesh Mehta
*Attorney, Agent, or Firm*—Fenwick & West LLP

[57] ABSTRACT

Two data sets are analyzed to determine disparity between them at various interrogation regions (302) of the data sets. The data sets can represent, for example, digital images, acoustical signals, or electrical signals. The size of interrogation regions (302) used for disparity analysis is varied dynamically. An initial interrogation region (302) from a reference data set is compared to several candidate regions (304) from a target data set. If none of the comparisons indicate a required level of similarity, the process is repeated with a larger interrogation region (302). This process of successively using larger interrogation regions (302) continues until either a maximum interrogation region (302) size is reached, or the required level of similarity is indicated in one of the comparisons.

36 Claims, 5 Drawing Sheets

DISPARITY MEASUREMENT WITH VARIABLY SIZED INTERROGATION REGIONS

FIELD OF INVENTION

This invention pertains to the field of calculating disparity between two sets of data. More specifically, this invention pertains to calculating disparity in two sets of data using variably sized windows.

BACKGROUND OF THE INVENTION

There are many fields in which measurements of disparity are useful. For two similar data sets, disparity is a measure of the difference in location, within each data set, of a subset of data which appears, either identically or similarly, in both data sets. Location, for purposes of disparity measurement, is based on one or more independent variables by which the data are ordered. For example, consider two images with the pixel values in each image being data ordered by horizontal and vertical location. If a sub-image of an apple appears in both images, but at different locations in each, the disparity associated with the sub-image of the apple is the difference between these locations. If the subimage appears in the second image five pixels to the right of the location of the sub-image in the first image, the disparity is five pixels to the right. Given similar data sets, a disparity map can be constructed which specifies where each region of a first data set appears in a second data set, relative to the location of the region in the first data set.

One field in which disparity measurements are used is stereoscopic image interpretation. In stereoscopic imaging, two or more images of a scene are created. The stereoscopic images represent substantially the same scene at the same time, but they represent the scene from different vantage points. Often, these different views are nearly parallel, and the separation of the vantage points is in a direction substantially perpendicular to the direction of the views. The direction of the separation of the vantage points is referred to as the epipolar direction. Each image in a stereoscopic set of images typically contains representations of many of the same objects as the other image. Although the objects are viewed from slightly different perspectives, the representation of each object is generally similar in both images. Due to the effect of parallax, the position of each object is usually different in each image. Objects of shallow depth (near the vantage points) exhibit more disparity between images than objects of greater depth (farther from the vantage points). This disparity is in the epipolar direction. By measuring the disparity associated with objects in stereoscopic images, the depth of those objects can be determined. By measuring the disparity associated with small regions in a stereoscopic set of images, a depth map for the represented scene can be determined. Three dimensional information is retrieved from the disparity in a set of two dimensional stereoscopic images.

Another application for disparity analysis involves a series of images representing substantially the same scene at distinct points in time. Such a series of images can, for example, constitute a motion picture sequence. When compressing such a series of images it is useful to determine disparity information for the images. The disparity information can be used with a key image to reconstruct the other images of the series, by appropriately moving portions of the key image as indicated by the disparity information.

Disparity information is also useful in determining velocity information for objects represented in a series of time differentiated images. Particle image velocimetry and laser speckle velocimetry utilize disparity information from time differentiated images to determine velocities within a field of view. A related field, laser speckle metrology, uses disparity information from two images of a specimen to determine, among other things, changes in the deformation of the specimen between the times corresponding to the two images.

Other applications of disparity analysis exist in non-image related fields. For example, disparity analysis can be used in audio analysis to determine the temporal disparity of sounds in acoustical signals. Temporal disparity can also be used with acoustical signals in seismic research to determine, through triangulation, the location of seismic events. Disparity analysis also has applications in the field of electronic signal analysis.

There are several methods for determining disparity information from sets of data. Generally, interrogation regions of a predetermined size are selected from a reference data set, and candidate regions in a target data set are compared to the interrogation region. The candidate region which is most similar to the interrogation region is identified as a matching region. The location of the matching region within the target data set, relative to the location of the interrogation region within the reference data set, specifies the disparity for the interrogation region. Conventional correlation techniques are generally used for determining the similarity of a candidate region and an interrogation region.

Using conventional methods, it is often difficult to predetermine the correct size for interrogation regions. Small interrogation regions tend to result in more incorrect matches than larger interrogation regions. Large interrogation regions, however, lack locality in that they determine disparity for a larger subset of data. The use of larger interrogation regions results in lower resolution disparity maps.

What is needed is a system and method for achieving high accuracy in disparity determination without unnecessarily sacrificing resolution.

SUMMARY OF THE INVENTION

In one embodiment, the present invention is a computer-implemented method for determining disparity in two sets of data. In an exemplary embodiment, the two sets of data comprise a stereoscopic set of images (110). The size of interrogation regions (302) used for disparity analysis is varied dynamically. An initial interrogation region (302) from a reference stereoscopic image (110*a*) is compared to several candidate regions (304) from a target stereoscopic image (110*b*). If none of the comparisons indicate a required level of similarity, the process is repeated with a larger interrogation region (302). The process of successively using larger interrogation regions (302) continues until either a maximum interrogation region (302) size is reached, or the required level of similarity is indicated in one of the comparisons.

For those parts of an image set which can be accurately matched using small interrogation regions (302), small interrogation regions (302) are used, maintaining spatial resolution. For those parts of the image set which cannot be accurately matched using small interrogation regions (302), larger interrogation regions (302) are used, maintaining the desired level of accuracy. For each part of the image set, the desired level of accuracy is maintained without unnecessarily sacrificing spatial resolution.

In other embodiments, the invention comprises an apparatus and a computer-readable medium containing a program for using these methods to determine the disparity in two sets of data.

DETAILED DESCRIPTION OF THE PREFERRED EMBODIMENTS

An exemplary embodiment of the present invention involves the extraction of depth information from a stereoscopic set of images.

Figure 1:
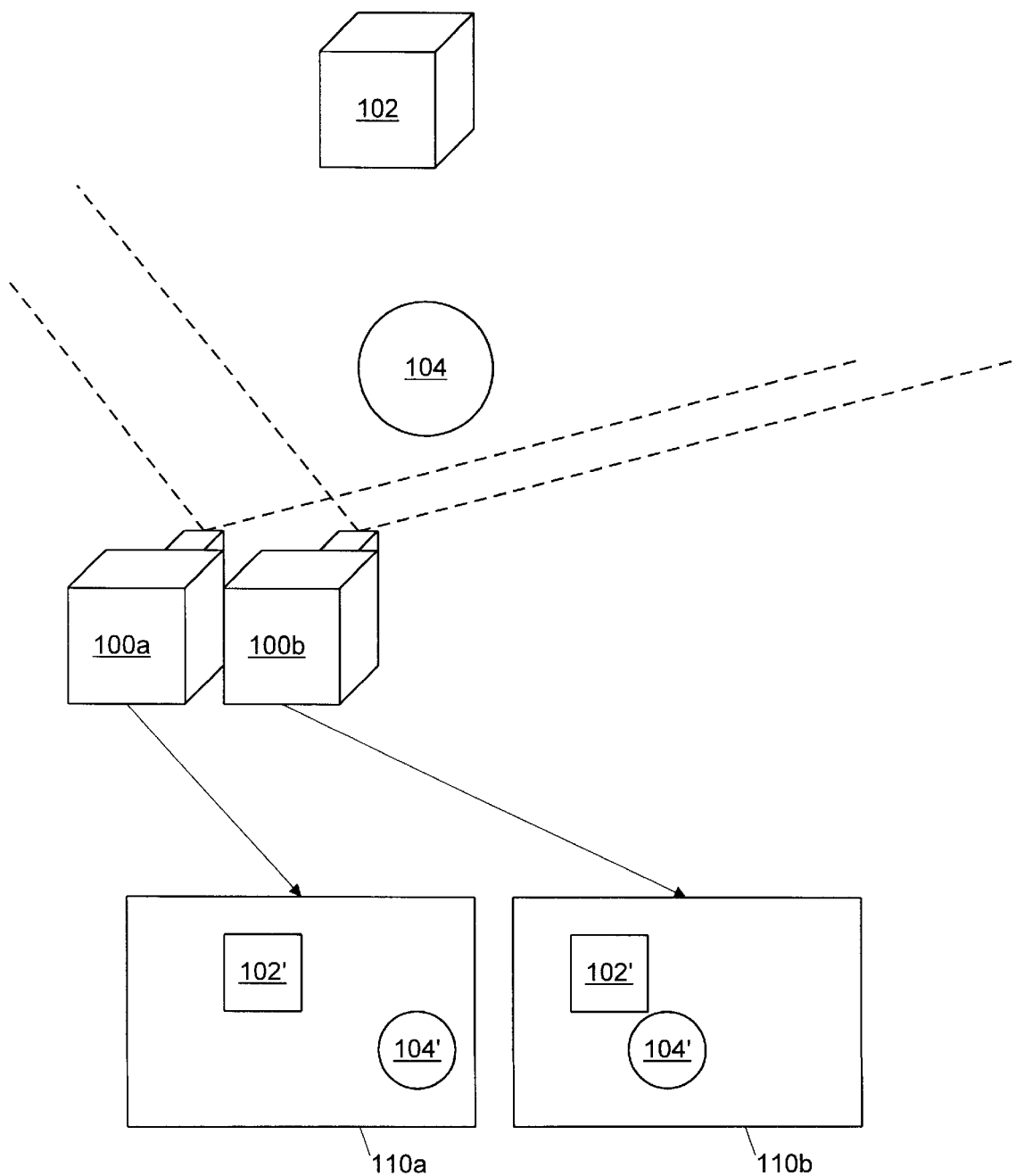
FIG. 1 is an illustration of a set of stereoscopic images 110a and 110b, and the scene represented by the images 110.

Referring now to FIG. 1, a set of cameras 100a, 100b simultaneously captures images 110a, 110b of a scene from slightly different vantage points. The dashed lines indicate the field of view of each camera 100. Objects 102, 104 in the scene appear in images 110 captured by cameras 100. Object 104 is represented in images 110 by sub-images 104' which exhibit greater epipolar disparity than sub-images 102' which represent object 102. This is due to the effect of parallax, and it indicates that object 104 is nearer to cameras 100 than is object 102. The depth of objects 102, 104 in the scene is calculated from Equation 1:

$$Depth_{object} = \frac{Depth_{image} * Offset_{vantage}}{Disparity_{object}} \quad \text{Eq. 1}$$

where $Depth_{object}$ is the depth of an object, $Depth_{image}$ is the distance from the image planes of cameras 100 to the camera vantage points, $Offset_{vantage}$ is the distance between the vantage points of cameras 100a and 100b, and $Disparity_{object}$ is the disparity associated with the sub-images of the object.

Measurements of disparity in the set of images 110 are used to generate depth information for the scene. In an exemplary embodiment of the present invention, image 110a is declared a reference image, and image 110b is declared a target image. Interrogation regions are selected in reference image 110a, and one disparity value is calculated for each, using the information in target image 110b. The interrogation regions are each centered on an interrogation point of reference image 110a, the interrogation points covering reference image 110a with a fixed distance between interrogation points. In one embodiment, each interrogation point is displaced from adjacent interrogation points by one pixel. In other embodiments, the interrogation points are spaced further apart. It is not necessary for the interrogation points to be arranged in a regular manner, and in alternate embodiments the interrogation points can be arranged in any manner.

Figure 2A:
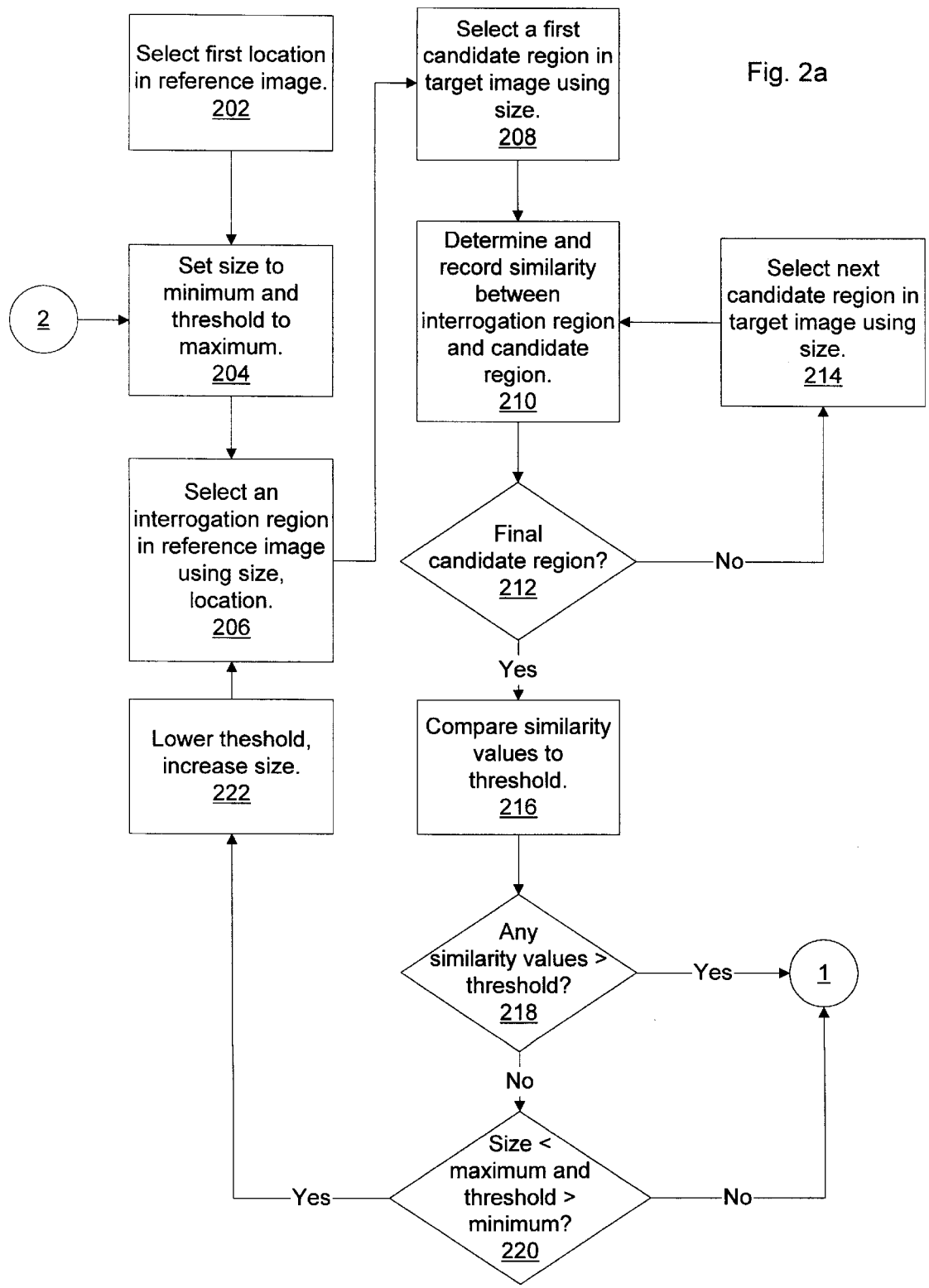
FIGS. 2a and 2b are flowcharts illustrating the operation of an exemplary embodiment.
Figure 2B:
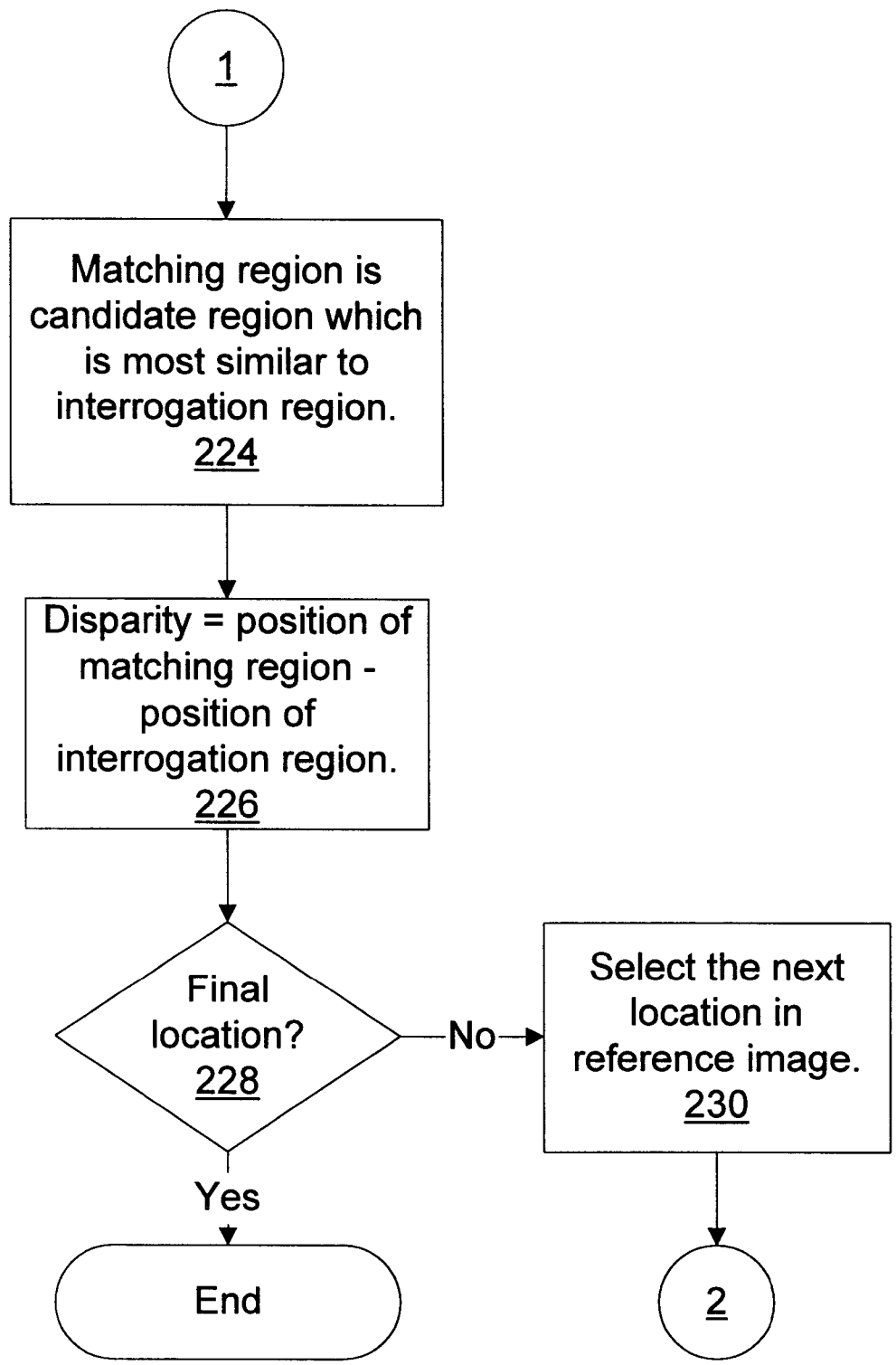
Figure 3:
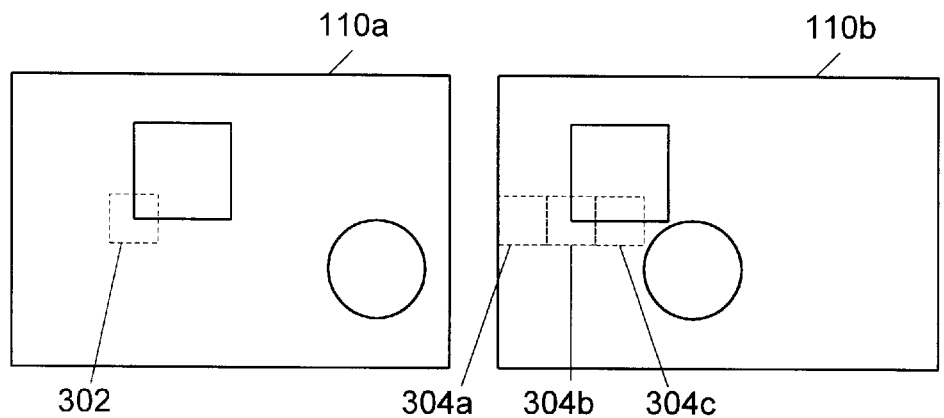
FIG. 3 is an illustration of interrogation region 302 in reference image 110a and candidate regions 304 in target image 110b.

FIGS. 2a, 2b, and 3 illustrate the operation of the exemplary embodiment of the present invention. A location variable is set 202 to the first interrogation point in reference image 110a. A size variable which indicates the size of interrogation region 302 is set 204 to a minimum value, and a threshold variable which indicates a similarity threshold is set 204 to a maximum value. Then interrogation region 302 of reference image 110a is determined 206 such that it is the size specified by the size variable, and it is centered at the interrogation point specified by the location variable.

A first candidate region 304a of target image 110b is selected 208. In the exemplary embodiment, all candidate regions 304 are the same size as interrogation regions 302. In other embodiments, however, candidate regions 304 can be different sizes than interrogation region 302.

Next, the similarity between interrogation region 302 and candidate region 304 is determined 210. There are many correlation methods for determining the similarity of two image regions. In some correlation methods, each region is filtered so that only the high frequency portion of each image is used for comparison. High-pass filtered versions of each region can be created by subtracting from each region the average pixel value of that region. Other correlation methods operate on data which have not been high-pass filtered.

If images 110 are full color images, the comparison can be performed independently for each color component. Where separate comparisons are performed for each color component, the similarity value for candidate region 304 can be a combination of the similarity values for each of the component colors. In the exemplary embodiment, the similarity value for candidate region 304 is the least of the component color similarity values.

One correlation method which can be used for calculating a similarity value is the normalized correlation method described by Equation 2:

$$S = \frac{\left(\sum_{i=1}^{N} I_i * C_i\right)}{\sqrt{\left(\sum_{i=1}^{N} I_i^2\right) * \left(\sum_{i=1}^{N} C_i^2\right)}} \quad \text{Eq. 2}$$

where S is the similarity value to be calculated, $I_i$ is the value of pixel i of interrogation region 302, $C_i$ is the value of pixel i of candidate region 304, and N is the number of pixels in a region. This same correlation method can be used in embodiments of the invention other than those which pertain to images. In the general case, N is the number of data points available in regions 302, 304, $I_i$ corresponds to each data point in interrogation region 302, and $C_i$ corresponds to each data point in candidate region 304.

The normalized correlation calculation shown in Equation 2, while useful, is computationally expensive. A simpler correlation calculation can be implemented using the normalized absolute value difference method of Equation 3:

$$S = 1 - \frac{\sum_{i=1}^{N} |I_i - C_i|}{N * P_{max}} \quad \text{Eq. 3}$$

where $P_{max}$ is the largest possible pixel value. In the exemplary embodiment, this method is used with $P_{max}$ being 255. Similarity value S varies from 0 to 1, with 0 representing absolute dissimilarity and 1 representing identity between candidate region 304 and interrogation region 302. Many other correlation methods will be apparent to those skilled in the art, including variations which do not normalize the similarity values to a scale from 0 to 1.

After the similarity value is calculated for candidate region 304, it is recorded 210. Then a test is performed 212 to determine whether the current candidate region 304 is the last to be tested. If it is not the last candidate region 304, the next candidate region 304 is selected 214, and the next similarity value is calculated and recorded 210. In selecting candidate regions 304 to be examined, different methods can be used. For stereoscopic images, disparity is expected only in the epipolar direction. In the exemplary embodiment the epipolar direction is horizontal. Also, since parallax requires that objects 102', 104' in image 110b, appear only to the left of the same objects 102', 104' in image 110a, candidate regions 304 are examined only if they would correspond to disparities to the left. In FIG. 3, candidate regions 304a, 304b, and 304c are examined, since all are centered on the same horizontal line as interrogation region 302, and all are to the left, relative to target image 110b, of interrogation region 302, relative to reference image 100a. For clarity, in FIG. 3, candidate regions 304 are not shown as overlapping. In actual practice, candidate regions 304 will often overlap. In the exemplary embodiment, each successive candidate region 304 is displaced from the previous candidate region 304 by only one pixel.

After all candidate regions 304 have been examined, and all similarity values for those candidate regions 304 have been recorded, the similarity values are compared 216 to the threshold variable. If no similarity value exceeds 218 the similarity threshold, then none of the candidate regions 304 are similar enough to interrogation region 302 to constitute a matching region. In that case the size variable is compared 220 to a maximum size and the threshold variable is compared 220 to a minimum value. If the size variable is below the maximum and the threshold variable is above the minimum, then the threshold is lowered 222 and the size is increased 222. A new interrogation region 302 is then reselected 206 at the same location, with the new, larger size.

Figure 4:
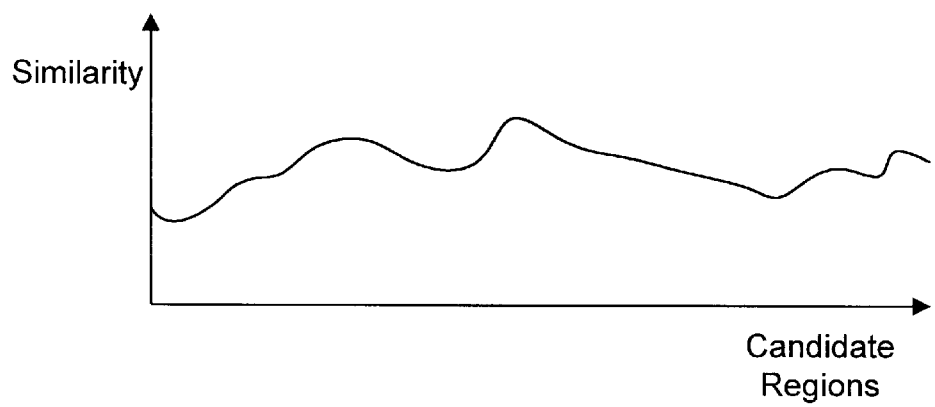
FIG. 4 is an illustration of a typical similarity profile when a small interrogation region 302 is used.
Figure 5:
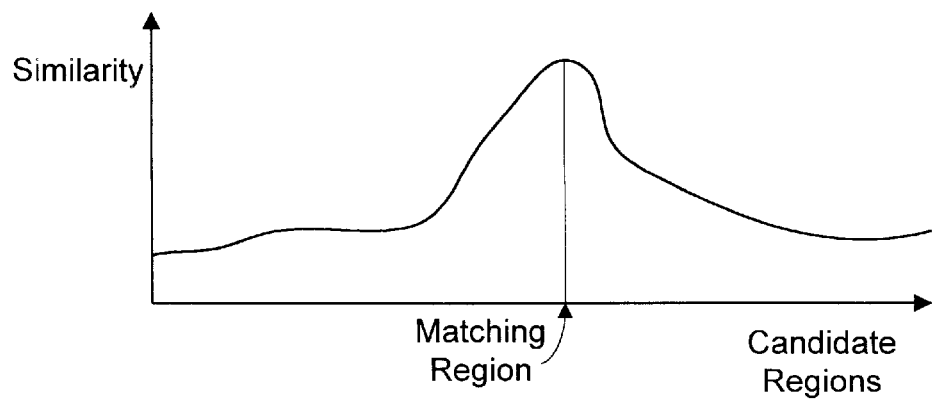
FIG. 5 is an illustration of a typical similarity profile when a large interrogation region 302 is used.

FIG. 4 illustrates a typical variation of similarity values for candidate regions 304 when a small interrogation region 302 is used. With a small number of sample points (pixels) in the regions 302, 304 to compare, background noise tends to mask the peak which should indicate the location of the matching region. FIG. 5 illustrates a typical variation of similarity values for candidate regions 304 where a larger interrogation region 302 is used. The peak which indicates the location of the matching region is clearly distinguishable over the background noise. Because smaller interrogation regions 302 are more likely to result in incorrect matches, due to spurious peaks in similarity, a higher threshold of similarity is generally useful for smaller interrogation regions 302. As the size of interrogation region 302 increases, and the chance of mismatch lessens, the threshold for similarity is lowered in the exemplary embodiment. In alternate embodiments, the similarity threshold can remain fixed for all interrogation regions 302. For some correlation methods it might be necessary to scale the similarity threshold with interrogation region 302 size, resulting in higher thresholds for larger sizes. Such variations are contemplated within the present invention. In the exemplary embodiment, for images which are 1000 pixels by 1000 pixels in size, interrogation regions 302 are initially 8 pixels by 8 pixels. If the similarity peak does not exceed 0.8, the interrogation region 302 size is increased to 32 pixels by 32 pixels. Then, if the peak similarity value does not exceed 0.7, the interrogation region 302 size is increased to 48 pixels by 48 pixels. Finally, if the peak similarity value does not exceed 0.4, an interrogation region 302 size of 96 pixels by 96 pixels is used with a new threshold of zero. Those skilled in the art will recognize that different combinations of interrogation region 302 size and threshold value will be appropriate in different circumstances.

The use of a threshold for similarity evaluation is simple and can be implemented for relatively fast performance. Other methods, however, yield a more accurate similarity determination in some circumstances. One such method is to calculate the mean and standard deviation for the set of similarity values corresponding to the candidate regions. For the candidate region corresponding to the peak value, a ratio is calculated. The numerator of the ratio is the peak similarity value minus the mean similarity value, and the denominator is the standard deviation of the similarity values. The ratio indicates how unique the peak value is in the set of similarity values, in terms of standard deviations from the mean. A ratio near zero indicates that the peak value is not particularly differentiated from the other similarity values, while a ratio near four will indicate that the peak value stands out significantly from the background. A threshold can then be applied to this ratio, resulting in a more accurate determination for some sets of data.

One advantage to using a correlation method such as that described in Equation 3, rather than the kind of method described in Equation 2, is that the results of each similarity calculation can be reused in the event that a larger interrogation region 302 size must be examined. By undoing the normalization performed in Equation 3, the summation of the absolute values of pixel differences is easily obtained. Because the pixels for which the calculation was performed are part of the larger regions 302, 304, it is not necessary to repeat this summation when applying Equation 3 to the larger regions 302, 304. Using Equation 3, the similarity value can be calculated progressively, continuing with the new pixels each time larger regions 302, 304 are needed. Using a calculation method such as that presented in Equation 2 requires starting the calculation anew each time regions 302, 304 are enlarged.

Returning to the exemplary embodiment detailed in the flowchart of FIGS. 2a and 2b, when there are similarity values which exceed 218 the threshold, or the limit for either the size or the threshold has been met 220, a matching region is determined 224. In alternate embodiments, a matching region is only determined 224 in the cases where the similarity threshold is exceeded. The candidate region 304 which corresponds to the maximum recorded similarity value is the region in target image 110b which most nearly matches interrogation region 302 in reference image 110a. The disparity for the interrogation point is calculated 226 as the position of the matching region in target image 110b minus the position of interrogation region 304 in reference image 110a. In the exemplary embodiment, this disparity value can be saved as an unsigned scalar value. In general cases, the disparity can be a vector quantity with two coordinates. The disparity value is saved with information specifying the location of the interrogation point. Optionally, the size of interrogation region 304 can be saved with the disparity information as well.

If the current interrogation point is the last to be examined 228, the process comes to an end. Otherwise, the next interrogation point is selected 230 into the location variable, the size variable is reset 204 to the minimum value, and the threshold variable is reset 204 to the maximum value. Then execution continues with the selection 206 of the next interrogation region 304 in reference image 110a.

Figure 6:
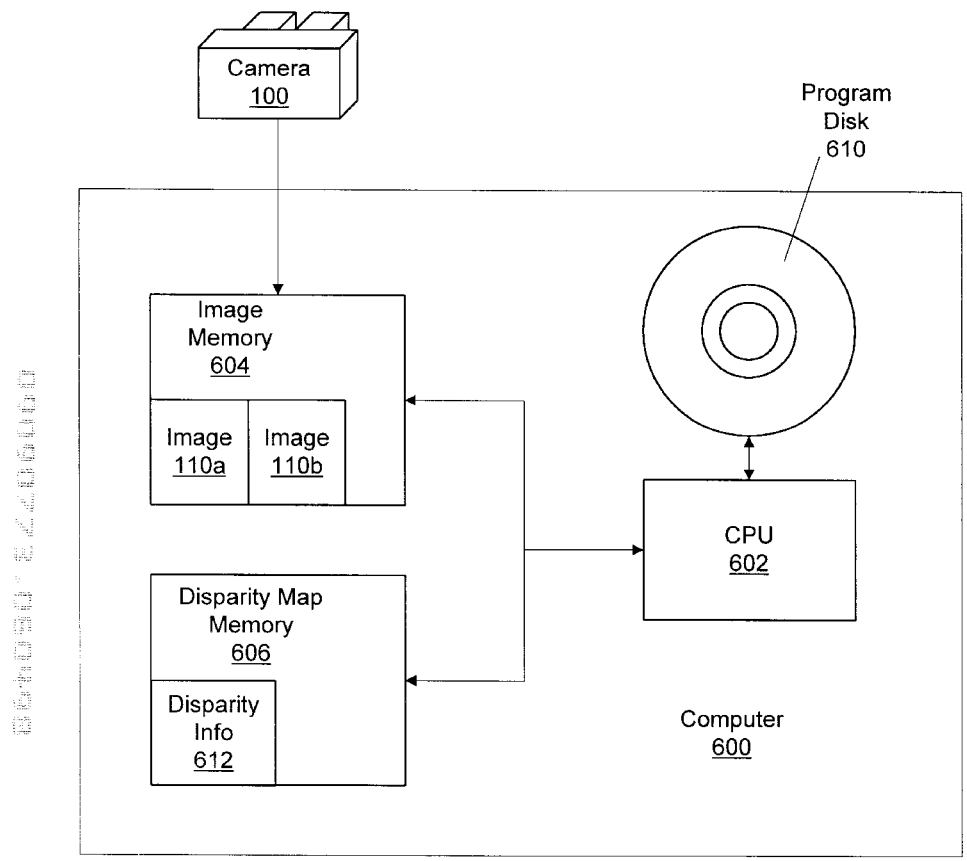
FIG. 6 is an illustration of one embodiment of the present invention.

FIG. 6 illustrates a computer apparatus 600 according to the present invention. Program disk 610 contains a computer program for causing central processing unit (CPU) 602 to carry out the method described above. Stereoscopic camera 100 captures images 110a and 110b, storing them in image memory 604 in computer 600. After determining the disparity information 612, CPU 602 stores the information 612 in disparity map memory 606. Disparity information 612 can be exported from computer 600, or it can be used by programs in computer 600 which require depth information. In alternate embodiments, some or all of the components of computer 600 can be included in camera 100. In still other embodiments, images 110a and 110b can be computer generated images, rather than images of a real world scene.

The above description is included to illustrate the operation of exemplary embodiments and is not meant to limit the scope of the invention. The scope of the invention is to be limited only by the following claims. From the above description, many variations that would be encompassed by the spirit and scope of the present invention will be apparent to one skilled in the art.

What is claimed is:

1. An apparatus for determining disparity in at least two data sets, the apparatus comprising:

a data memory for storing a reference data set, and for storing a target data set;

a central processing unit (CPU) coupled to the data memory, which CPU has access to the reference data set and the target data set;

a program memory coupled to the CPU, for storing an array of instructions, which instructions, when executed by the CPU, cause the CPU to:

select a first interrogation region in the reference data set, the first interrogation region being a first size;

select more than one initial candidate region in the target data set;

for each initial candidate region, determine an associated similarity value, each similarity value quantifying the similarity between the associated initial candidate region and the first interrogation region;

use a first threshold and the similarity values associated with the initial candidate regions to determine whether any initial candidate region meets a similarity criterion specified by the first threshold;

responsive to at least one of the initial candidate regions meeting the similarity criterion specified by the first threshold:

determine as a matching region an initial candidate region which meets the similarity criterion specified by the first threshold; and determine as a disparity value the difference between the position of the first interrogation region in the reference data set and the position of the matching region in the target data set; and responsive to none of the initial candidate regions meeting the similarity criterion specified by the first threshold:

select a second interrogation region in the reference data set, the second interrogation region being a second size, the second size being larger than the first size;

select more than one subsequent candidate region in the target data set;

for each subsequent candidate region, determine an associated similarity value, each similarity value quantifying the similarity between the associated subsequent candidate region and the second interrogation region;

use a second threshold and the similarity values associated with the subsequent candidate regions to determine whether any subsequent candidate region meets a similarity criterion specified by the second threshold; and responsive to at least one of the subsequent candidate regions meeting the similarity criterion specified by the second threshold:

determine as the matching region a subsequent candidate region which meets the similarity criterion specified by the second threshold; and determine as the disparity value the difference between the position of the second interrogation region in the reference data set and the position of the matching region in the target data set.

2. The apparatus of claim 1, wherein the reference data set and the target data set both correspond to images.

3. The apparatus of claim 2, wherein the reference data set and the target data set comprise a stereoscopic set of images.

4. The apparatus of claim 2, wherein the reference data set and the target data set comprise a time-differentiated set of images.

5. The apparatus of claim 1, wherein the reference data set and the target data set both represent acoustical signals.

6. The apparatus of claim 1, wherein the second interrogation region encompasses the first interrogation region.

7. The apparatus of claim 1, wherein the similarity criterion specified by the second threshold corresponds to less similarity than does the similarity criterion specified by the first threshold.

8. The apparatus of claim 1, wherein the similarity criterion specified by the second threshold corresponds to less similarity than does the similarity criterion specified by the first threshold, and the second interrogation region encompasses the first interrogation region.

9. The apparatus of claim 8, wherein the reference data set and the target data set both correspond to images.

10. A method for determining disparity in at least two data sets, the method comprising the steps of:

selecting a first interrogation region in a reference data set, the first interrogation region being a first size;

selecting more than one initial candidate region in a target data set;

for each initial candidate region, determining an associated similarity value, each similarity value quantifying the similarity between the associated initial candidate region and the first interrogation region;

using a first threshold and the similarity values associated with the initial candidate regions to determine whether any initial candidate region meets a similarity criterion specified by the first threshold;

responsive to at least one of the initial candidate regions meeting the similarity criterion specified by the first threshold:

determining as a matching region an initial candidate region which meets the similarity criterion specified by the first threshold; and determining as a disparity value the difference between the position of the first interrogation region in the reference data set and the position of the matching region in the target data set; and responsive to none of the initial candidate regions meeting the similarity criterion specified by the first threshold:

selecting a second interrogation region in the reference data set, the second interrogation region being a second size, the second size being larger than the first size;

selecting more than one subsequent candidate region in the target data set;

for each subsequent candidate region, determining an associated similarity value, each similarity value quantifying the similarity between the associated subsequent candidate region and the second interrogation region;

using a second threshold and the similarity values associated with the subsequent candidate regions to determine whether any subsequent candidate region meets a similarity criterion specified by the second threshold; and responsive to at least one of the subsequent candidate regions meeting the similarity criterion specified by the second threshold:

determining as the matching region a subsequent candidate region which meets the similarity criterion specified by the second threshold; and determining as the disparity value the difference between the position of the second interrogation region in the reference data set and the position of the matching region in the target data set.

11. The method of claim 10, wherein the reference data set and the target data set both correspond to images.

12. The method of claim 11, wherein the reference data set and the target data set comprise a stereoscopic set of images.

13. The method of claim 11, wherein the reference data set and the target data set comprise a time-differentiated set of images.

14. The method of claim 10, wherein the reference data set and the target data set both represent acoustical signals.

15. The method of claim 10, wherein the second interrogation region encompasses the first interrogation region.

16. The method of claim 10, wherein the similarity criterion specified by the second threshold corresponds to less similarity than does the similarity criterion specified by the first threshold.

17. The method of claim 10, wherein the similarity criterion specified by the second threshold corresponds to less similarity than does the similarity criterion specified by the first threshold, and the second interrogation region encompasses the first interrogation region.

18. The method of claim 17, wherein the reference data set and the target data set both correspond to images.

19. A computer-readable medium containing a computer program for determining disparity in at least two data sets, the computer program comprising an array of instructions for causing a central processing unit (CPU) to perform the steps of:

selecting a first interrogation region in a reference data set, the first interrogation region being a first size;

selecting more than one initial candidate region in a target data set;

for each initial candidate region, determining an associated similarity value, each similarity value quantifying the similarity between the associated initial candidate region and the first interrogation region;

using a first threshold and the similarity values associated with the initial candidate regions to determine whether any initial candidate region meets a similarity criterion specified by the first threshold;

responsive to at least one of the initial candidate regions meeting the similarity criterion specified by the first threshold:

determining as a matching region an initial candidate region which meets the similarity criterion specified by the first threshold; and determining as a disparity value the difference between the position of the first interrogation region in the reference data set and the position of the matching region in the target data set; and responsive to none of the initial candidate regions meeting the similarity criterion specified by the first threshold:

selecting a second interrogation region in the reference data set, the second interrogation region being a second size, the second size being larger than the first size;

selecting more than one subsequent candidate region in the target data set;

for each subsequent candidate region, determining an associated similarity value, each similarity value quantifying the similarity between the associated subsequent candidate region and the second interrogation region;

using a second threshold and the similarity values associated with the subsequent candidate regions to determine whether any subsequent candidate region meets a similarity criterion specified by the second threshold; and responsive to at least one of the subsequent candidate regions meeting the similarity criterion specified by the second threshold:

determining as the matching.region a subsequent candidate region which meets the similarity criterion specified by the second threshold; and determining as the disparity value the difference between the position of the second interrogation region in the reference data set and the position of the matching region in the target data set.

20. The computer-readable medium of claim 19, wherein the reference data set and the target data set both correspond to images.

21. The computer-readable medium of claim 20, wherein the reference data set and the target data set comprise a stereoscopic set of images.

22. The computer-readable medium of claim 20, wherein the reference data set and the target data set comprise a time-differentiated set of images.

23. The computer-readable medium of claim 19, wherein the reference data set and the target data set both represent acoustical signals.

24. The computer-readable medium of claim 19, wherein the second interrogation region encompasses the first interrogation region.

25. The computer-readable medium of claim 19, wherein the similarity criterion specified by the second threshold corresponds to less similarity than does the similarity criterion specified by the first threshold.

26. The computer-readable medium of claim 19, wherein the similarity criterion specified by the second threshold corresponds to less similarity than does the similarity criterion specified by the first threshold, and the second interrogation region encompasses the first interrogation region.

27. The computer-readable medium of claim 26, wherein the reference data set and the target data set both correspond to images.

28. An apparatus for determining disparity in at least two data sets, the apparatus comprising:

data storing means for storing a reference data set and a target data set;

setting means for setting a first interrogation region in the reference data set, the first interrogation region being a first size and setting a plurality of initial candidate regions in the target data set;

determining means for determining a similarity value between the first interrogation region and each of the initial candidate regions and determining a matching between the first interrogation region and each of the candidate regions by comparing the similarity value with a first threshold; and control means, responsive to none of the initial candidate regions matching the first interrogation region on the basis of the first threshold, for enlarging the first interrogation region and changing the first threshold to a second threshold different from the first threshold.

29. An apparatus according to claim 28, wherein the second threshold is lower than the first threshold.

30. An apparatus according to claim 28, wherein the reference data set and the target set comprise a stereoscopic set of images.

31. An apparatus according to claim 30, wherein the similarity value specified by the second threshold corresponds to less similarity than the similarity value specified by the first threshold.

32. An apparatus according to claim 28, wherein said data storing means comprises an image memory, and said determining means and control means are implemented in a central processing unit.

33. A method for determining disparity in at least two data sets, the method comprising the steps of:

storing a reference data set;

storing a target data set;

setting a first interrogation region in the reference data set, the first interrogation region being a first size;

setting a plurality of initial candidate regions in the target data set;

determining a similarity value between the first interrogation region and each of the initial candidate regions;

determining a matching between the first interrogation region and each of the candidate regions by comparing the similarity value with a first threshold; and responsive to none of the initial candidate regions matching the first interrogation region on the basis of the first threshold, enlarging the first interrogation region and changing the first threshold to a second threshold different from the first threshold.

34. A method according to claim 33, wherein the second threshold is lower than the first threshold.

35. A method according to claim 33, wherein the reference data set and the target set comprise a stereoscopic set of images.

36. A method according to claim 35, wherein the similarity value specified by the second threshold corresponds to less similarity than the similarity value specified by the first threshold.

* * * * *

UNITED STATES PATENT AND TRADEMARK OFFICE
CERTIFICATE OF CORRECTION

PATENT NO.: 6,141,440

DATED: October 31, 2000

INVENTOR: Roger D. Melen

It is certified that errors appear in the above-identified patent and that said Letters Patent is hereby corrected as shown below:

On the cover sheet, under References Cited, replace patent number "5,510,931" with --5,510,831--.

Column 10, line 22, replace "matching.region" with --matching region--.

Signed and Sealed this

Eighth Day of May, 2001

Attest:

NICHOLAS P. GODICI

*Attesting Officer*     Acting Director of the United States Patent and Trademark Office